(12) United States Patent
Chen

(10) Patent No.: US 8,007,215 B2
(45) Date of Patent: Aug. 30, 2011

(54) FASTENING MECHANISM

(76) Inventor: David Chen, Shengang Township, Changhua County (TW)

( * ) Notice: Subject to any disclaimer, the term of this patent is extended or adjusted under 35 U.S.C. 154(b) by 76 days.

(21) Appl. No.: 12/572,818

(22) Filed: Oct. 2, 2009

(65) Prior Publication Data
US 2011/0081219 A1 Apr. 7, 2011

(51) Int. Cl.
*F16B 13/06* (2006.01)
(52) U.S. Cl. ............................. 411/60.2; 411/26; 411/38
(58) Field of Classification Search .................. 411/60.2, 411/38, 24–28, 60.3, 78, 34, 35, 80.1, 44, 411/46, 51
See application file for complete search history.

(56) References Cited

U.S. PATENT DOCUMENTS

| | | | | |
|---|---|---|---|---|
| 3,143,916 A * | 8/1964 | Rice | | 411/37 |
| 3,313,083 A * | 4/1967 | Flora | | 52/718.02 |
| 3,385,156 A * | 5/1968 | Polos | | 411/30 |
| 3,601,869 A * | 8/1971 | Flora et al. | | 411/548 |
| 3,836,704 A * | 9/1974 | Coules | | 174/138 D |
| 4,089,248 A * | 5/1978 | Anscher | | 411/38 |
| 4,218,954 A * | 8/1980 | Morel | | 411/15 |
| 5,690,454 A * | 11/1997 | Smith | | 411/30 |

* cited by examiner

*Primary Examiner* — Gary Estremsky
(74) *Attorney, Agent, or Firm* — Muncy, Geissler, Olds & Lowe, PLLC

(57) ABSTRACT

A fastening mechanism which is easy to handle and operate. The fastening mechanism includes a bolster, a bolt, at least two elbows, and a support bracket. The bolster is provided with several retainer walls externally disposed, one side thereof being formed into an opening and the inside thereof being formed into a hollow space with a passage through which the bolt can pass. At least two elbows extend from the bottom end of the retainer walls. When the bolt mates with the inner thread formed in the retainer wall, a friction plate formed with the support bracket lodges into a tapered slot between two retainer walls so that the support bracket cannot move against the retainer walls. The at least two elbows angle outwards to retain the support bracket when the bolt is traveling along the inner thread.

6 Claims, 5 Drawing Sheets

US 8,007,215 B2

FASTENING MECHANISM

BACKGROUND OF THE INVENTION

1. Field of the Invention

The present invention relates to a fastening mechanism and fastening technique and, in particular, to a fastening mechanism using a bolt to screw in an integrally formed bolster so as to expand the latter and fasten an object.

2. Description of the Prior Art

The fastening device purchasable on the market is generally made of metals like iron, steel, zinc, etc. It is usually composed of several components for fastening, such as a bolt and nut combination with accessories like a washer or even a spring washer, which serves to keep the engaging force tighter when the bolt is screwed into a compression ring or the object body so as to avoid accidental loosening of the fastening mechanism. On the other hand, such a fastening device is very likely to deform when an excessive fastening force is applied.

For such a defect noticeable in the prior art, an improvement is seriously required.

The present invention provides a fastening mechanism which is easily and rapidly operable with better stability sufficient to overcome the traditional problems of inconvenient assembly and/or detachment and an unsatisfactory fastening effect.

SUMMARY OF THE INVENTION

It is an object of the present invention to provide a fastening mechanism which has a bolster integrally formed in one piece, wherein a bolt is screwed down to mate with an inner thread of a support bracket so as to cause retainer walls of the support bracket to expand their outer diameter outwardly, thereby generating a frictional force to fasten an object.

It is another object of the present invention to provide a fastening mechanism which can be operated conveniently and rapidly with stability.

The present invention provides for a fastening mechanism which can achieve the above objects, and is composed of a bolster, elbows, a support bracket and a bolt. The bolster is provided with a plurality of retainer walls externally disposed. One side thereof is formed into an opening and the inside thereof is formed into a hollow space with a passage for the bolt to pass through. From the bottom end of the retainer walls there extend at least two elbows and a support bracket having tilted sections so as to be in contact with the retainer walls and an inner thread to be screw combined with the bolt. After being combined with the inner thread of the support bracket, the bolt can push the support bracket to the bolster and, at the same time, widen the retainer walls outwards. By engaging the bolster and the support bracket with extended elbows, the supporting bracket is sustained thereto without worry of detachment.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
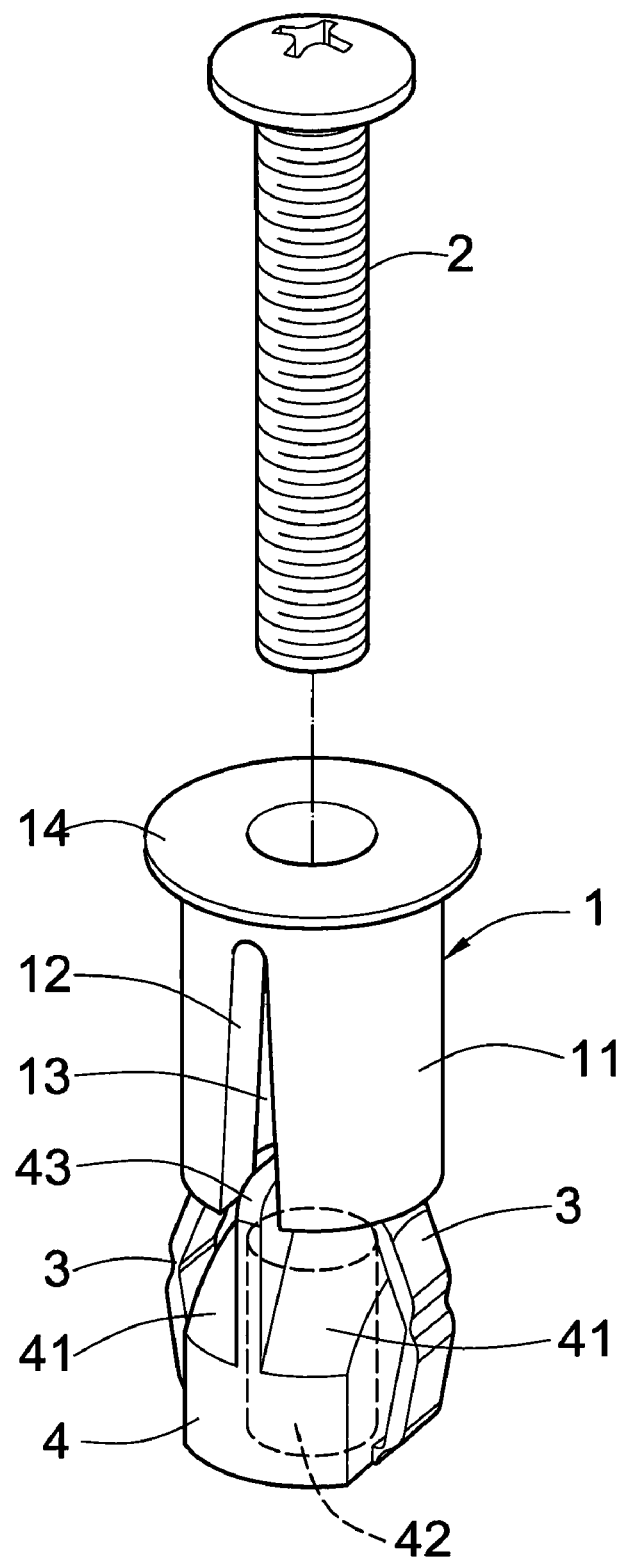
FIG. 1 is an exploded three dimensional view showing the essential components of the present invention.
Figure 3:
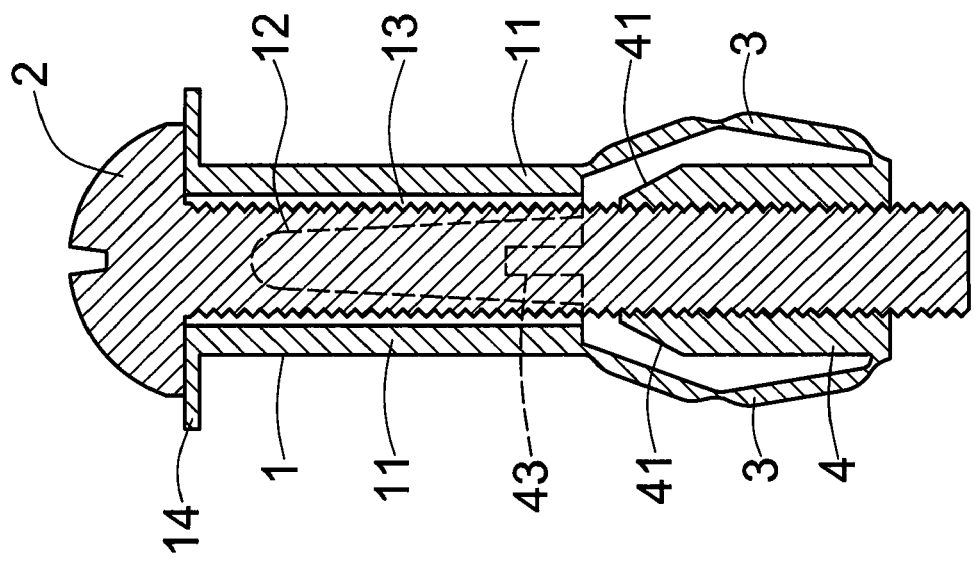
FIG. 3 is a sectional view of the assembled fastening mechanism of the present invention.
Figure 2:
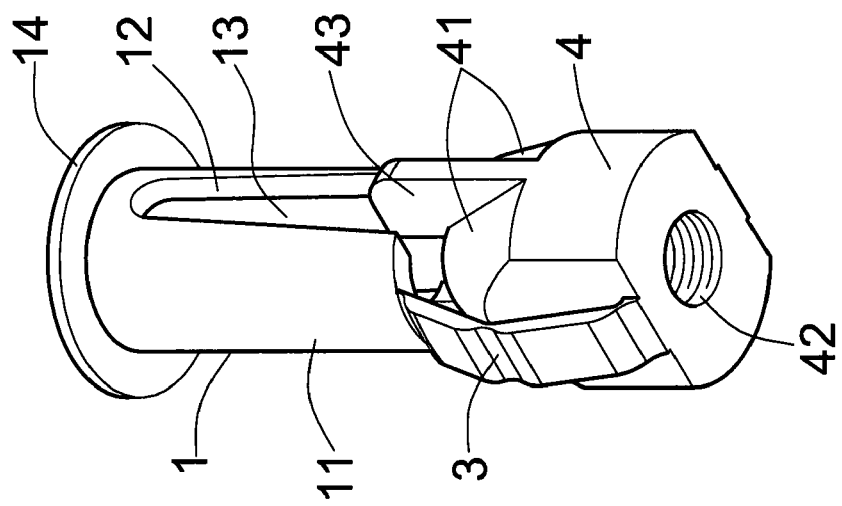
FIG. 2 is an exploded three dimensional view of the present invention viewed from another angle.

Referring to FIG. 1 through FIG. 3, the fastening mechanism of the present invention comprises a bolster 1; a bolt 2, at least two elbows 3 and a support bracket 4. The bolster 1 is provided with a plurality of retainer walls 11 externally disposed. One side of each wall is formed into an opening and the inside thereof is formed into an upwardly tapered hollow space 13 with a passage for the bolt 2 to pass through. Extending from the bottom end of the retainer walls 11 are at least two elbows 3 and a support bracket 4 having a tilted section 41 to be in contact with the retainer walls 11 and an inner thread 42 to be screw jointed with the bolt 2. The support bracket 4 and the retainer walls 11 are connected together as one piece by joining the top edge of the former with the bottom edge of the latter via at least two opposing elbows 3 as bridges. The elbows 3 are able to deform elastically.

The retainer wall 11 is extended from the bottom surface of the bolster 1 and a tapered slot 12 with a downward opening is formed between two retainer walls 11. Two opposing tapered slots 12 essentially carry out the embodiment of the present invention. At the other side of the bolster 1 a flange 14 is formed around the fringe of the bolster 1. The outer diameter of the flange 14 is larger than that of the bolster 1. The support bracket 4 has a friction plate 43 formed along its circumference to be lodged in the tapered slots 12 of the bolster 1 so as to limit the movement of the support bracket 4 with respect to the retainer walls 11.

Meanwhile, the support bracket 4 is provided with inner thread 42 to be screw combined with the bolt 2 so as to push up the support bracket 4 along the retainer walls 11 and, at the same time, exert a transverse force to gradually widen the transverse diameter of the retainer walls 11. The tilted section 41 formed on the support bracket 4 is inclined to face against the hollow space 13 surrounded by the retainer walls 11. At least a pair of the friction plates 43 formed along the circumference of the support bracket 4 can be lodged into the tapered slot 12 to avoid mutual rotation between the retainer walls 11 and the support bracket 4. In addition, by joining the bolster 1 with the support bracket 4, the support bracket 4 will not be separated when the retainer walls travel outwards.

The elbows 3 are angled outwards. As the bolt 2 travels along the inner thread 42 and causes the support bracket 4 to exert a force to the retainer walls 11, the elbows stretch outwardly.

Figure 4:
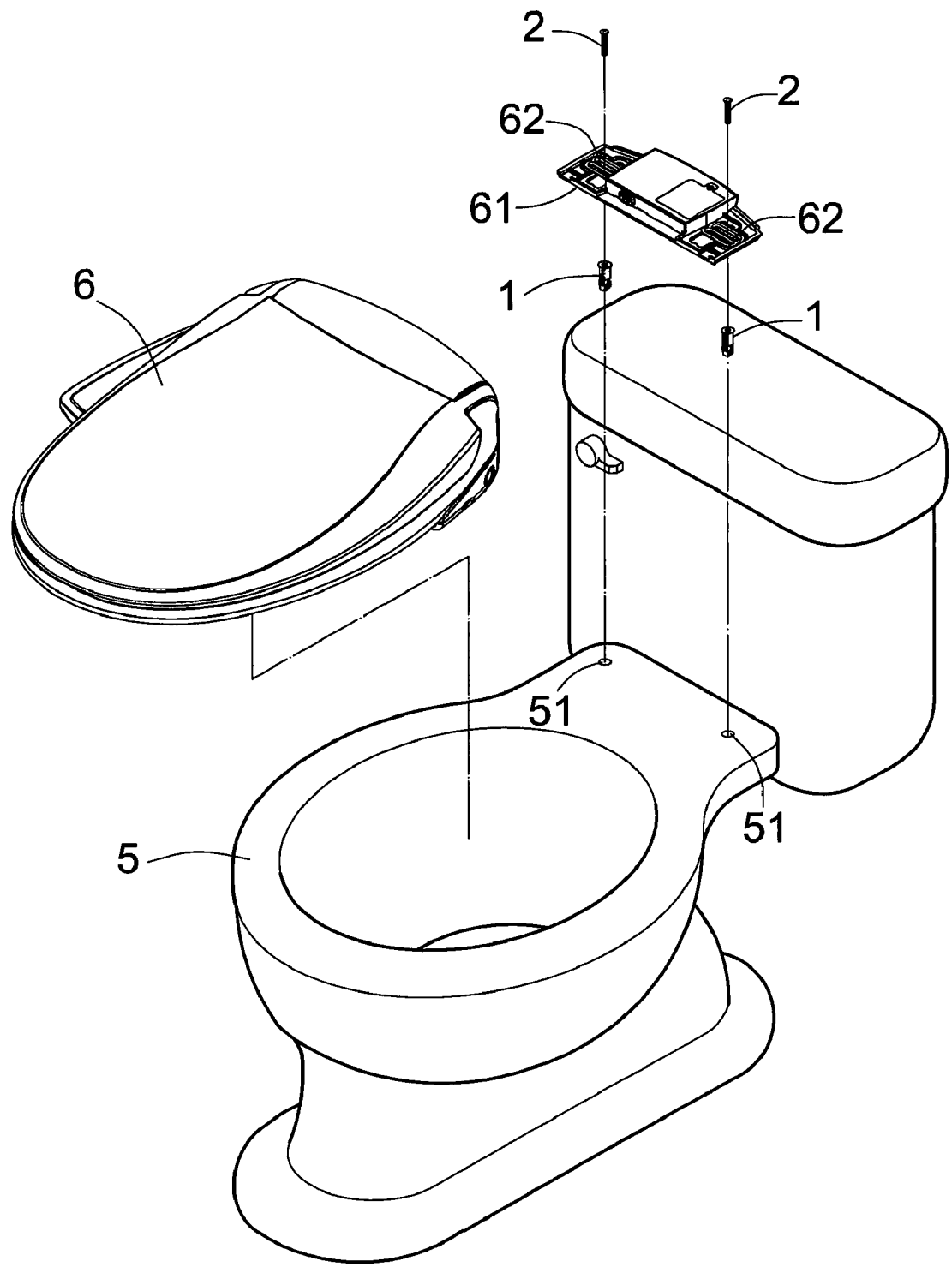
FIG. 4 is a three dimensional exploded view showing the fastening mechanism of the present invention being used to fasten a seat assembly to a close stool.
Figure 5:
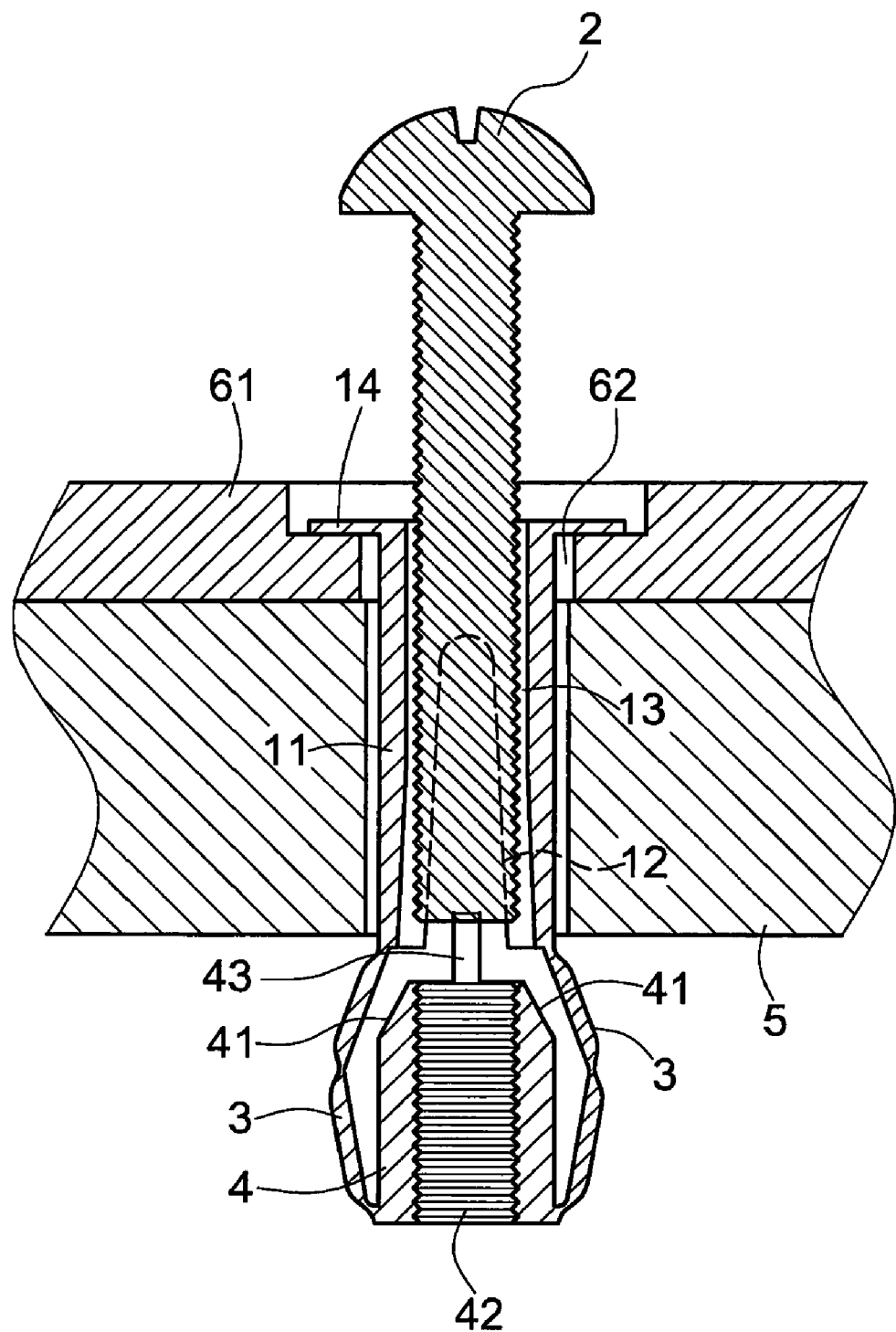
FIG. 5 is a schematic view showing the state of the fastening mechanism before an operation to fasten the seat assembly to a close stool.
Figure 6:
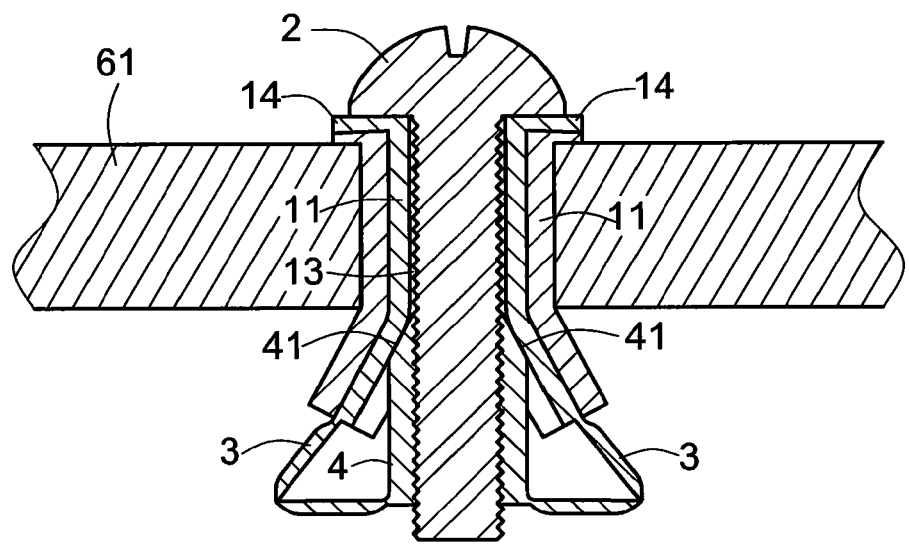
FIG. 6 is a schematic view showing the state of the fastening mechanism after completion of operation to fasten the seat assembly to a close stool, in which the elbows are expand outwards.
Figure 7:
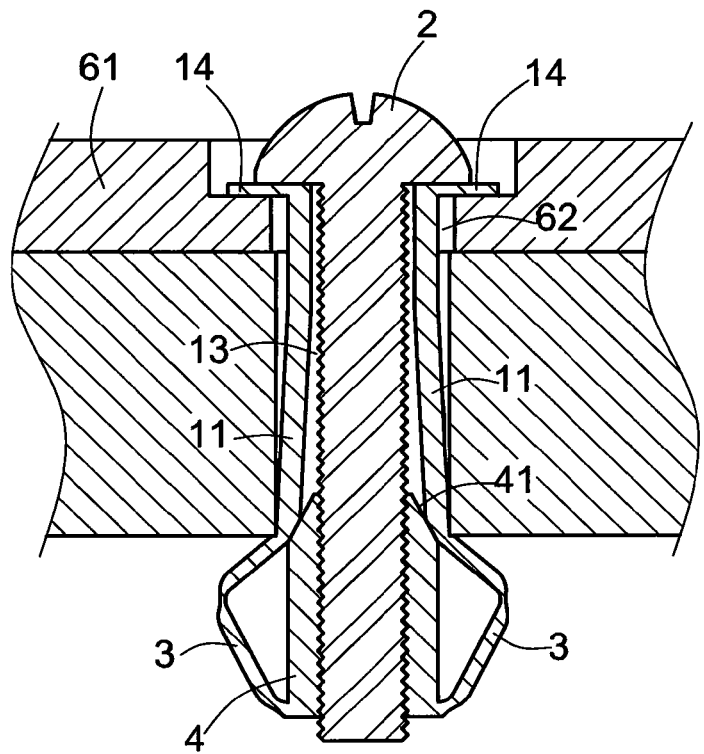
FIG. 7 is a schematic view showing the application of the fastening mechanism to a structure with an elongated through hole.

For a clear illustration of the practical application of the present invention, replacement of the seat assembly 6 for a toilet 5 using the fastening mechanism of the present invention will be used as an example. As shown in FIG. 4 through FIG. 6, the toilet 5 is provided with at least two through holes 51. The bolster 1 of the fastening mechanism is at first engaged to a hinge bracket 61 provided on the toilet 5 by passing through the through hole 51. The bolt 2 is then screwed into the inner thread 42 of the support bracket 4 so as to engage with the retainer wall 11 by pulling the support bracket 4 upwards, thereby engaging the hinge bracket 61 on the toilet 5. The seat assembly 6 can then be hinged to the hinge bracket 61, and the flange 14 of the bolster 1 is affixed to an elongate slot 62 of the hinge bracket 61 so as to avoid trapping the whole fastening mechanism in the hinge assembly 61, or burying the bolster 1 down in the hinge bracket 61 in case the mechanism is fastened too tight.

When the bolt 2 tightens the bolster 1 gradually, the support bracket 4 will be forced in the hollow space 13 surrounded by the retainer walls 11 by way of the tilted section 41, such that the support bracket 4 pushes the retainer walls 11 to widen their transverse diameter gradually. The retainer walls 11 are detained at the inner wall of the through holes 51 on the toilet 5, thereby achieving the aim of perfect fastening. Incidentally, the bolster 1 is placed downward from above the toilet 5 so that the worker does not have to put his head down to observe. Instead, the worker may simply check the position of the bolt 2 with a finger before installing a nut. With this structure the tightening effect is improved, an ease of work is assured.

It is apparent to a person skill in the art than the basic area of the fastening mechanism provided by the invention can be implemented in many different ways. The invention and its embodiment are thus not restricted to the examples described above, but may vary with the scope of the claims.

In all it is understood that the present invention is a high level technical creation. By no means does the present invention utilize conventional technology or knowledge known prior to the application for patent, nor could the present application be easily made by persons skill in the art prior to the application for patent. The invention has neither been published or put to public use, nor displayed in an exhibition therefore the present invention is entitled to a patent.

What is claimed is:

1. A fastening mechanism comprising:
    a bolster,
    a bolt,
    at least two elbows, and
    a support bracket,
    wherein the bolster is provided with a plurality of retainer walls externally disposed, one side thereof being formed into an opening and the inside thereof being formed into a hollow space with a passage for the bolt to pass through,
    wherein, the at least two elbows extend from the bottom end of the retainer walls, and the support bracket is provided with tilted sections to contact the retainer walls, and an inner thread to be screw jointed with the bolt; and
    wherein the plurality of retainer walls extend from the bottom surface of the bolster and have a tapered slot with a downward opening formed between two of the plurality of retainer walls, and the support bracket has a friction plate formed along its circumference.

2. The fastening mechanism of claim 1, wherein the friction plate of the support bracket is to be lodged in the tapered slot of the bolster so as to limit the movement of the support bracket with respect to the retainer walls.

3. The fastening mechanism of claim 1, wherein a flange is formed at the opposite side of the bolster from where the tapered slot is formed between two of the plurality of retainer walls.

4. The fastening mechanism of claim 3, wherein the outer diameter of the flange is larger than that of the bolster.

5. The fastening mechanism of claim 1, wherein the bolt pulls the support bracket up along the retainer walls to approach the bolster while being meshed with the inner thread, and exerts a transverse force to shift the retainer walls outwards, the support bracket being prevent from being separated with the aid of elbows which connect the bolster and the support bracket together.

6. The fastening mechanism of claim 1, wherein the elbows which connect the support bracket and the retainer walls are angled outwards and, as the bolt travels along the inner thread and causes the support bracket to exert a force to the retainer walls, the elbows stretch outwardly from the support bracket.

* * * * *